(12) United States Patent
Li et al.

(10) Patent No.: US 12,309,110 B2
(45) Date of Patent: May 20, 2025

(54) ACKNOWLEDGEMENT BASED AUDIO COMMUNICATIONS

(71) Applicant: Hewlett-Packard Development Company, L.P., Spring, TX (US)

(72) Inventors: Chun Feng Li, Taipei (TW); Xinhang Yang, Chongqing (CN); Hsiang-Ta Ke, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 27 days.

(21) Appl. No.: 18/566,861

(22) PCT Filed: Jun. 15, 2021

(86) PCT No.: PCT/US2021/037353
§ 371 (c)(1),
(2) Date: Dec. 4, 2023

(87) PCT Pub. No.: WO2022/265623
PCT Pub. Date: Dec. 22, 2022

(65) Prior Publication Data
US 2024/0205180 A1   Jun. 20, 2024

(51) Int. Cl.
*H04L 51/10* (2022.01)
*G10L 15/26* (2006.01)

(52) U.S. Cl.
CPC .............. *H04L 51/10* (2013.01); *G10L 15/26* (2013.01)

(58) Field of Classification Search
None
See application file for complete search history.

(56) References Cited

U.S. PATENT DOCUMENTS

| 10,257,296 B2 | 4/2019 | Uchida et al. |
| 2014/0148209 A1 | 5/2014 | Weng et al. |

(Continued)

FOREIGN PATENT DOCUMENTS

| CN | 108052195 A | 5/2018 |
| CN | 109788423 A | 5/2019 |

(Continued)

*Primary Examiner* — June Sison
(74) *Attorney, Agent, or Firm* — Knobbe, Martens, Olson & Bear, LLP (57) ABSTRACT

Techniques for determining a status of exchange of audio messages between a source computing device and a destination computing device are described. In an example, an audio input is received from a user from a source computing device. A source audio message and a source text file are then generated based on the audio input. The source audio message is then sent to the destination computing device. A destination text file is then received from the source computing device, where the destination text file is generated based on a destination audio message received at the destination computing device, and where the destination audio message is received by the destination computing device corresponding to the source audio message. The source text file is then compared to the destination text file to determine a status of transmission of the source audio message to the destination computing device. An acknowledgement indicating the status of transmission of the source audio message to the destination computing device is then generated.

15 Claims, 7 Drawing Sheets

(56) References Cited

U.S. PATENT DOCUMENTS

| | | |
|---|---|---|
| 2019/0306100 A1 | 10/2019 | Guthery et al. |
| 2020/0111473 A1* | 4/2020 | Tang ................. H04L 65/61 |
| 2020/0184989 A1 | 6/2020 | Jang et al. |
| 2020/0195771 A1 | 6/2020 | Kim |
| 2020/0304862 A1* | 9/2020 | Cwik ................. H04N 21/6547 |
| 2021/0233517 A1 | 7/2021 | Gong et al. |

FOREIGN PATENT DOCUMENTS

| | | |
|---|---|---|
| CN | 110113316 A | 8/2019 |
| CN | 112037765 A | 12/2020 |
| JP | 5868927 B2 | 2/2016 |
| TW | 201911290 A | 3/2019 |

\* cited by examiner

ACKNOWLEDGEMENT BASED AUDIO COMMUNICATIONS

BACKGROUND

Computing devices are used for facilitating communication between different users connected to a network. The computing devices may utilize various communication protocols, such as Voice over Internet Protocol (VoIP) to allow such communication. In VoIP-based communications, audio-based communication sessions are established over Internet Protocol (IP) network to let the users communicate with each other.

BRIEF DESCRIPTION OF DRAWINGS

The following detailed description references the drawings, wherein.

Throughout the drawings, identical reference numbers designate similar, but not necessarily identical, elements. The drawings provide examples and/or implementations consistent with the description; however, the description is not limited to the examples and/or implementations provided in the drawings.

DETAILED DESCRIPTION

Generally, during a VoIP call, a user provides an audio input to his/her computing device, which is transmitted over the IP network to other computing devices, being utilized by other users. For example, an audio input may be received on a source computing device and may be converted into data packets and transmitted to a destination computing device via the IP network. Subsequently, the destination computing device may receive the data packets and may convert them into an audio message corresponding to the audio input and may play the audio message for a user of the destination computing device.

In aforementioned scenario, if a user of the source computing device, hereinafter referred to as a first user, wishes to know whether the audio message has been delivered to the destination computing device or not, the first user has to seek a verbal confirmation from a user of the destination computing device, hereinafter referred to as a second user. As a result, the first user may have to wait for a verbal acknowledgement from the second user before the first user may provide subsequent audio inputs. This situation is further aggravated in conference calls where the acknowledgement may be sought from multiple users resulting in increased waiting time for the first user.

Also, in some situations, some data packets from amongst the data packets corresponding to the audio input provided by the first user may get dropped during transmission. Accordingly, the audio message generated at the destination computing device may not fully reciprocate the audio input provided by the first user. Thus, it is difficult for users to determine if their audio inputs are being indeed transmitted and delivered to other users during an audio-based communication session.

According to example implementations of the present subject matter, techniques acknowledgement-based audio communications are described. An acknowledgement corresponding to an audio transmission may provide a status of delivery of the audio transmission during an audio-based communication session.

In an example implementation of the present subject matter, an audio input may be received from a user at a source computing device. The audio input may be received from a microphone of the source computing device. A source audio message and a source text file may then be generated corresponding to the received audio input. The generated source audio message may then be transmitted to a destination computing device, where the destination computing device is in an audio-based communication session with the computing device over a VoIP-based network.

In an example, the destination computing device may receive a destination audio message corresponding to the transmitted source audio message, play the received destination audio message, and may generate a destination text file based on the played destination audio message. Thereafter, the source text file and the destination text file may be compared to determine a status of transmission of the source audio message from the source computing device to the destination computing device.

The status of the transmission of the source audio message may determine if the audio input provided by the user of the source computing device has been correctly received by the user of the destination computing device. Accordingly, an acknowledgement indicating the status of transmission of the source audio message may be generated.

As would be appreciated, the aforementioned techniques facilitate in automatically determining status of transmission of audio messages during an audio-based communication session, thereby reducing the delays associated with verbal confirmation. Further, using said techniques, it can also be ascertained whether the complete audio messages are being exchanged between the computing devices in the communication session, thereby ensuring high efficiency in exchange of the audio messages.

The manner in which the example computing devices are implemented are explained in detail with respect to FIG. 1 to FIG. 7. While aspects of described computing device may be implemented in any number of different electronic devices, environments, and/or implementations, the examples are described in the context of the following example device(s). It is to be noted that drawings of the present subject matter shown here are for illustrative purposes and are not to be construed as limiting the scope of the subject matter claimed.

Figure 1:
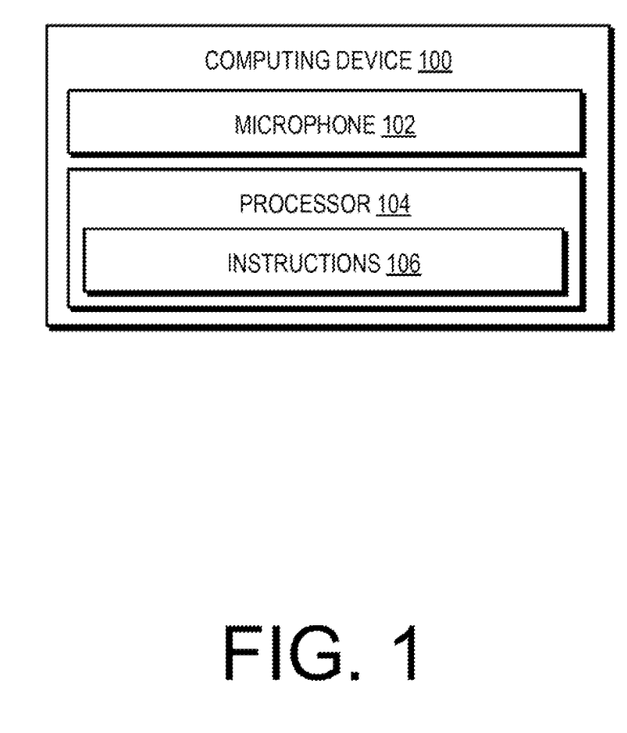
FIG. 1 is a block diagram of an example computing device, as per an example of the present subject matter.

FIG. 1 illustrates a block diagram of a computing device 100, as per an example of the present subject matter.

Examples of the computing device 100 may include, but are not limited to laptops, desktops, tablets, smartphones, and wearable computing devices.

In an example, the computing device 100 may be involved in an audio-based communication session with other computing devices (not depicted in FIG. 1) over a VoIP-based network. In said example, the audio-based communication session may be implemented through a communication application, such as a voice-chat application, executing on the computing devices.

The computing device 100 may include a microphone 102. The microphone 102 may be used to receive an audio input from a user. The microphone 102 may be implemented either as a single microphone or as an array of microphones. The microphone 102 may either be integrated within the computing device 100 or may be a part of an audio device, such as a wireless headset, which may be externally coupled to the computing device 100. It would be noted that any other type of microphone, which may be capable of receiving the audio input from the user, may be coupled to the computing device 100, and may be used without deviating from the scope of the present subject matter.

The computing device 100 may further include a processor 104, which may be coupled to the microphone 102. In an example, the processor 104 may fetch and execute the computer-readable instructions 106 stored in a memory (not depicted in FIG. 1), to determine a status of transmission of audio messages from the computing device 100 to other computing devices in the audio-based communication session, amongst other functions. The status of the transmission of audio messages may indicate if the audio messages sent from the user of the computing device 100 have been correctly received by the users of other computing devices in the audio-based communication session.

In operation, on receiving the audio input from the user through the microphone 102, the processor 104 may generate a source audio message and a source text file corresponding to the audio input. The source text file may represent a textual format of the audio input.

The processor 104 may then cause the source audio message to be transmitted to a destination computing device (not depicted in FIG. 1). The destination computing device may be one of the computing devices involved in the audio-based communication session with the computing device 100.

Thereafter, the processor 104 may cause a destination text file to be received on the computing device 100. In an example, the destination text file may be received from the destination computing device. In said example, the destination text file may be generated corresponding to a destination audio message played at the destination computing device, where the destination audio message may be received by the destination computing device corresponding to the source audio message.

Subsequently, the processor 104 may compare the source text file and the destination text file. The processor 104 may compare the source text file and the destination text file to determine a status of transmission of the source audio message from the computing device 100 to the destination computing device. Accordingly, the processor 104 may generate an acknowledgement indicating the status of transmission of the source audio message from the computing device 100 to the destination computing device. The manner in which the status of transmission of the source audio message is determined is described in detail in conjunction with FIG. 2.

Figure 2:
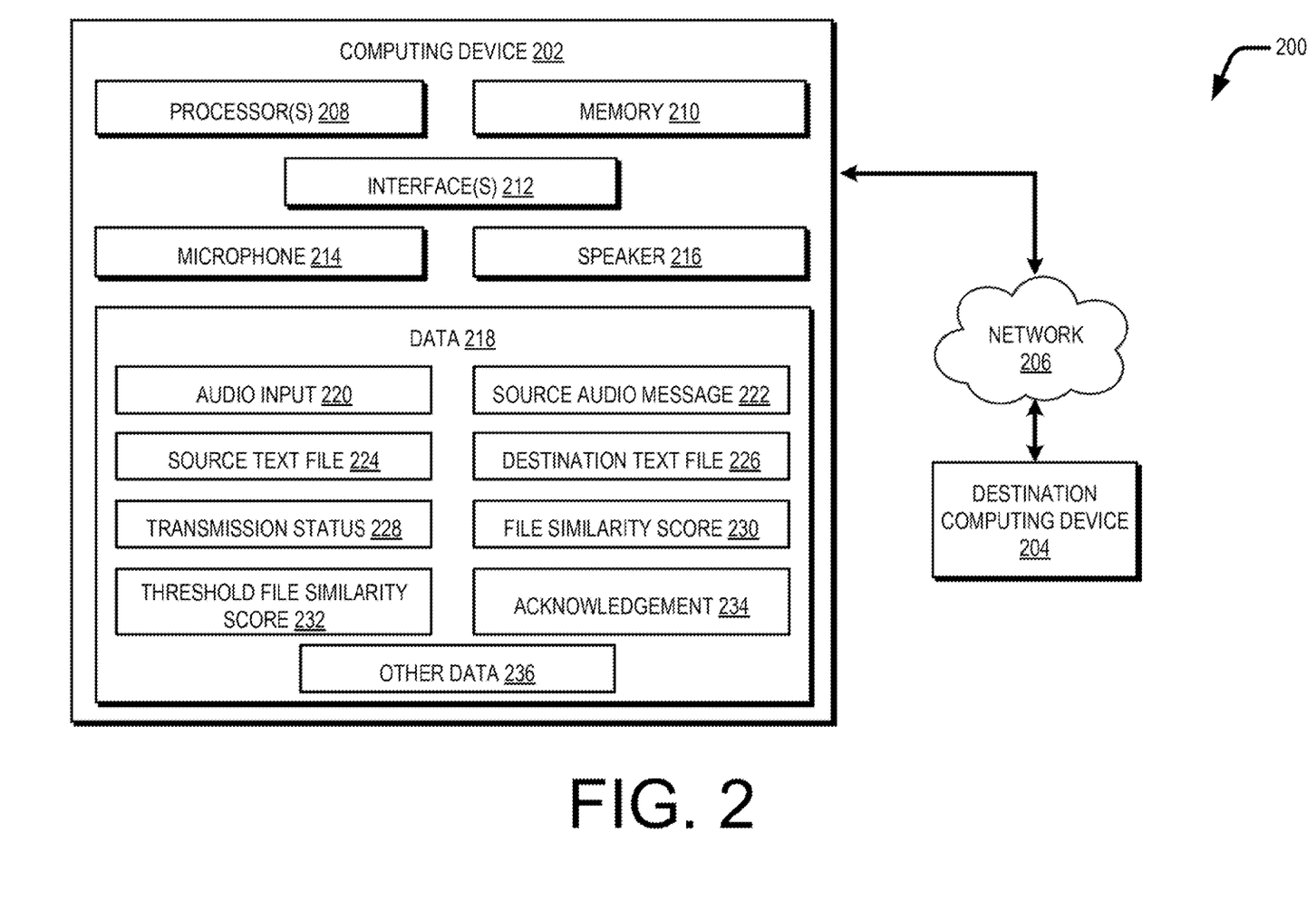
FIG. 2 is an example of communication environment with a detailed block diagram of the example computing device, as per an example of the present subject matter.

FIG. 2 illustrates a communication environment 200 comprising a computing device 202, as per an example of the present subject matter. In an example, the computing device 202 may correspond to the computing device 100 depicted in FIG. 1.

As described earlier, the computing device 202 may be in an audio-based communication session with a destination computing device 204 among other computing devices, over a network 206. The network 206 may be a wireless or a wired network, or a combination thereof. Further, the network 206 may be a collection of individual networks, interconnected with each other and functioning as a single large network. Examples of such individual networks include, but are not limited to, Global System for Mobile communication (GSM) network. Universal Mobile Telecommunications System (UMTS) network, Long Term Evolution (LTE) network, personal communications service (PCS) network, Time-division multiple access (TDMA) network, Code-Division Multiple Access (CDMA) network, next-generation network (NGN), public switched telephone network (PSTN), and Integrated Services Digital Network (ISDN). Depending on the terminology, the network 206 may include various network entities, such as gateways and routers; however, such details have been omitted to maintain the brevity of the description.

In an example, the computing device 202 may host an application, which when executed, enables a user (not depicted in FIG. 2) of the computing device 202 to communicate with a user (not depicted in FIG. 2) of the destination computing device 204. The application may execute to establish an audio-based communication session between the computing device 202 and the destination computing device 204.

The computing device 202 may include a processor 208, a memory 210 coupled to the processor 208, an interface 212, microphone 214, speaker 216, and data 218. In an example, the microphone 214 and the processor 208 of the computing device 202 may correspond to the microphone 102 and the processor 104 of the computing device 100.

The functions of various elements shown in the figures, including any functional blocks labelled as "processor(s)", may be provided through the use of dedicated hardware as well as hardware capable of executing instructions. When provided by a processor, the functions may be provided by a single dedicated processor, by a single shared processor, or by a plurality of individual processors, some of which may be shared. Moreover, explicit use of the term "processor" would not be construed to refer exclusively to hardware capable of executing instructions, and may implicitly include, without limitation, digital signal processor (DSP) hardware, network processor, application specific integrated circuit (ASIC), field programmable gate array (FPGA). Other hardware, standard and/or custom, may also be coupled to processor 208.

The memory 210 may be a computer-readable medium, examples of which include volatile memory (e.g., RAM), and/or non-volatile memory (e.g., Erasable Programmable read-only memory, i.e., EPROM, flash memory, etc.). The memory 210 may be an external memory, or internal memory, such as a flash drive, a compact disk drive, an external hard disk drive, or the like. The memory 210 may further include data which either may be utilized or generated during the operation of the computing device 202.

The interface 212 may allow the connection or coupling of the computing device 202 with one or more other devices, through a wired (e.g., Local Area Network, i.e., LAN) connection or through a wireless connection (e.g., Bluetooth®, WiFi). The interface 212 may also enable intercommunication between different logical as well as hardware components of the computing device 202.

The microphone 214 provided in the computing device 202 may allow reception of an audio input from the user to the computing device 202. The microphone 214 may be implemented as a single microphone, or as a plurality of microphones as a microphone array, located at various location in the housing of the computing device 202. Further, the microphone 214 may be integrated within the computing device 202 or may be externally coupled to the computing device 202, wired or wirelessly, through the interface 212. The speaker 216 may provide an audio output to the user of the computing device 202. The speaker 216 may be integrated within the computing device 202 or may be externally coupled to the computing device 202. In one example, an audio device may be externally coupled to the computing device 202. The microphone 214 and the speaker 216 may be integrated within the audio device.

Furthermore, the data 218 may include data utilized or generated by the processor 208 while performing a variety of functions. In an example, the data 218 includes audio input 220, source audio message 222, source text file 224, destination text file 226, transmission status 228, file similarity score 230, threshold file similarity score 232, acknowledgement 234, and other data 236. The other data 236, amongst other things, may serve as a repository for storing data that is processed, or received, or generated as a result of the execution of the instruction by the processor 208. The expressions 'transmission status' and 'status of transmission' has been used interchangeably throughout the description to refer to the status of transmission of the source audio message to the destination computing device.

In operation, the user of the computing device 202 may initiate a communication and may provide the audio input 220 to the computing device 202 through the microphone 214. On receiving the audio input 220 from the microphone 214, the processor 208 may generate a source audio message 222 corresponding to the received audio input 220. As may be understood, the audio input 220 may be received in analog format. Accordingly, the processor 208 may generate the source audio message 222 by converting the audio input 220 into digital format using an analog-to-digital converter (ADC). However, any other techniques known to a person skilled in the art may also be used for generating the source audio message 222 based on the received audio input 220 without deviating from the scope of the present subject matter.

The processor 208 may further generate a source text file 224 corresponding to the received audio input 220. The source text file 224 may represent a textual format of the audio input 220 received from the user. In one example, the source text file 224 may be generated based on Natural Language Processing (NLP). However, any other techniques for converting the audio input 220 to a textual format for generating the source text file 224 may be used without deviating from the scope of the present subject matter.

The processor 208 may then cause the source audio message 222 to be transmitted to the destination computing device 204. In an example, the source audio message 222 may be transmitted to the destination computing device 204 via the network 206. Subsequently, the processor 208 may cause the computing device 202 to receive the destination text file 226 from the destination computing device 204. In an example, the destination text file 226 may be generated corresponding to a destination audio message played at the destination computing device 204, where the destination audio message may be received by the destination computing device 204 corresponding to the source audio message 222.

Thereafter, the processor 208 may compare the source text file 224 and the destination text file 226 to determine a transmission status 228 of the source audio message 222. In an example, the processor 104 may determine the transmission status 228 of the source audio message 222 based on a file similarity score 230, generated based on the comparison of the source text file 224 and the destination text file 226. In said example, the file similarity score 230 may be indicative of a measure of similarity between the source text file 224 and the destination text file 226.

In an example, the processor 208 may determine the transmission status 228 of the source audio message 222 to be successful, when the file similarity score 230 is determined to be greater than a threshold file similarity score 232. The threshold file similarity score 232 may be indicative of an extent of similarity entailed between the source text file 224 and the destination text file 226 that enables the source audio message 222 to be correctly heard and interpreted at the destination computing device. On the other hand, the processor 208 may determine the transmission status 228 of the source audio message 222 to be unsuccessful, when the file similarity score 230 is determined to be lower than the threshold file similarity score 232.

Thereafter, the processor 208 may generate an acknowledgement 234 indicating the transmission status 228 of the source audio message 222 from the computing device 202 to the destination computing device 204. The processor 208 may generate the acknowledgement 234 indicating the transmission status 228 of the source audio message 222 in a number of ways.

In an example, the processor 208 may generate the acknowledgement 234 by changing colour of an indicator corresponding to the destination computing device 204 in the user interface (UI) of the application being used for communication between the computing device 202 and the destination computing device 204. In said example, upon determining the transmission status 228 to be successful, the processor 208 may change the colour of the indicator to green. Similarly, upon determining the transmission status 228 to be successful, the processor 208 may change the colour of the indicator to red.

In another example, the processor 208 may generate the acknowledgement 234 by generating an acknowledgement message. It would be noted that the aforementioned examples of providing acknowledgement 234 are only illustrative and the acknowledgement 234 can be provided to the user of the computing device 202 in any other manner, without deviating from the scope of the present subject matter.

The unsuccessful transmission status 228 of source audio message 222 from the computing device 202 to the destination computing device 204 may be attributed to a deficiency in operation of the computing device 202. In an example, upon determining the transmission status 228 of the source audio message 222 to be unsuccessful, the processor 208 may determine a state of network connectivity of the computing device 202 and identify if a reason for unsuccessful transmission of the source audio message 222 is poor network connectivity. In said example, the processor 208 may determine the state of network connectivity by transmitting and receiving loopback packets. In another example, upon determining the transmission status 228 of the source audio message 222 to be unsuccessful, the processor 208 may determine an operating state of the microphone 214 and identify if a reason for unsuccessful transmission of the source audio message 222 is fault in operational state of the microphone 214.

If the network connectivity of the computing device is found to be poor or the operating state of the microphone is found to be faulty, the processor 208 may generate a notification indicating the poor network connectivity of the computing device 202 or the faulty operating state of the microphone 214.

It would be noted that while the present description has been described with respect to the computing device 202 communicating with a single computing device in the audio-based communication session, i.e., the destination computing device 204, it may be understood that the same has been done for the sake of clarity. It would further be noted that the computing device 202 may be in communication with multiple computing devices simultaneously, such as during a conference call, without deviating from the scope of the present subject matter.

As may be noted, the computing device 202 allows to automatically determine whether the source audio messages are being correctly transmitted to the destination computing device or not, thereby reducing the delays associated with verbal confirmations. The computing device 202 further facilitates ascertaining whether complete source audio messages are being transmitted to the destination computing device 204, thereby ensuring high efficiency in transmission of the source audio messages to the destination computing device 204.

Figure 3:
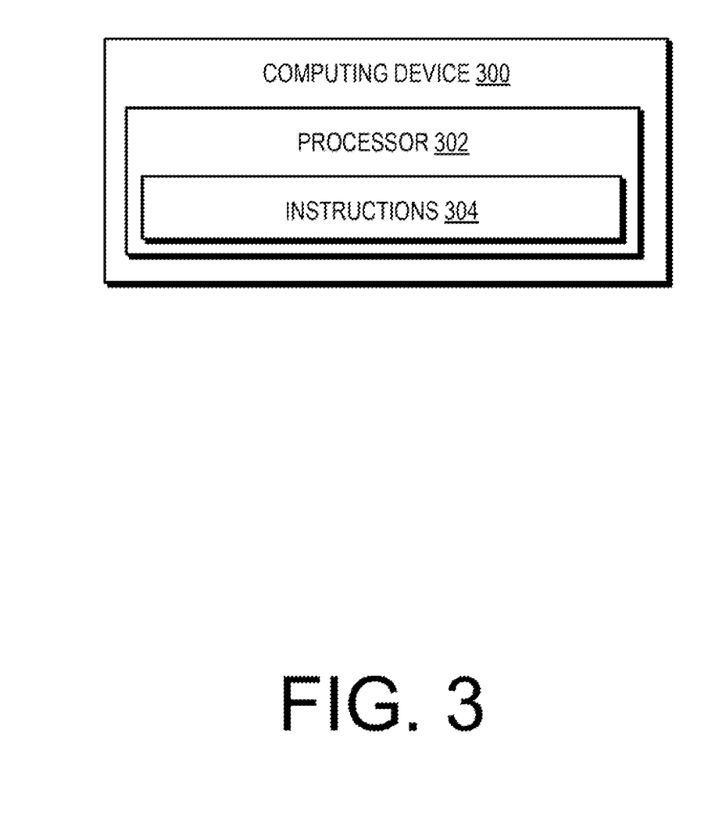
FIG. 3 is a block diagram of an example computing device, as per another example of the present subject matter.

FIG. 3 illustrates a block diagram of a computing device 300, as per another example of the present subject matter. Examples of the computing device 300 may include, but are not limited to, laptops, desktop PCs, tablet PCs, smartphones, and wearable computing devices.

In an example, the computing device 300 may be in an audio-based communication session with other computing devices (not depicted in FIG. 1) over a VoIP-based network. In said example, the audio-based communication session may be implemented through an application, such as a voice-chat application, executing on the computing devices.

The computing device 300 may include a processor 302 Among other functions, the processor 302 may fetch and execute the computer-readable instructions 304 stored in a memory (not depicted in FIG. 3), to determine a status of reception of audio messages from other computing devices in the audio-based communication session. The status of the reception of audio messages determines if the audio messages sent from users of other computing devices have been correctly received at the computing device 300 in the audio-based communication session.

In an example, the processor 302 may cause a destination audio message and a source text file to be received from a source computing device (not depicted in FIG. 3). The source computing device may be one of the computing devices involved in the audio-based communication session with the computing device 300. The destination audio message may correspond to a source audio message, where the source audio message and the source text file may be generated at the source computing device based on an audio input 220 received from a user at the source computing device.

The processor 302 may then generate a destination text file based on the received destination audio message. The destination text file may represent a textual format of the destination audio message. Thereafter, the processor 302 may compare the source text file and the destination text file to determine a status of reception of the source audio message from the source computing device to the computing device 300. Subsequently, the processor 302 may transmit an acknowledgement indicating the status of reception of the source audio message to the source computing device. The manner in which the status of reception of the source audio message is determined is described in detail in conjunction with FIG. 4.

Figure 4:
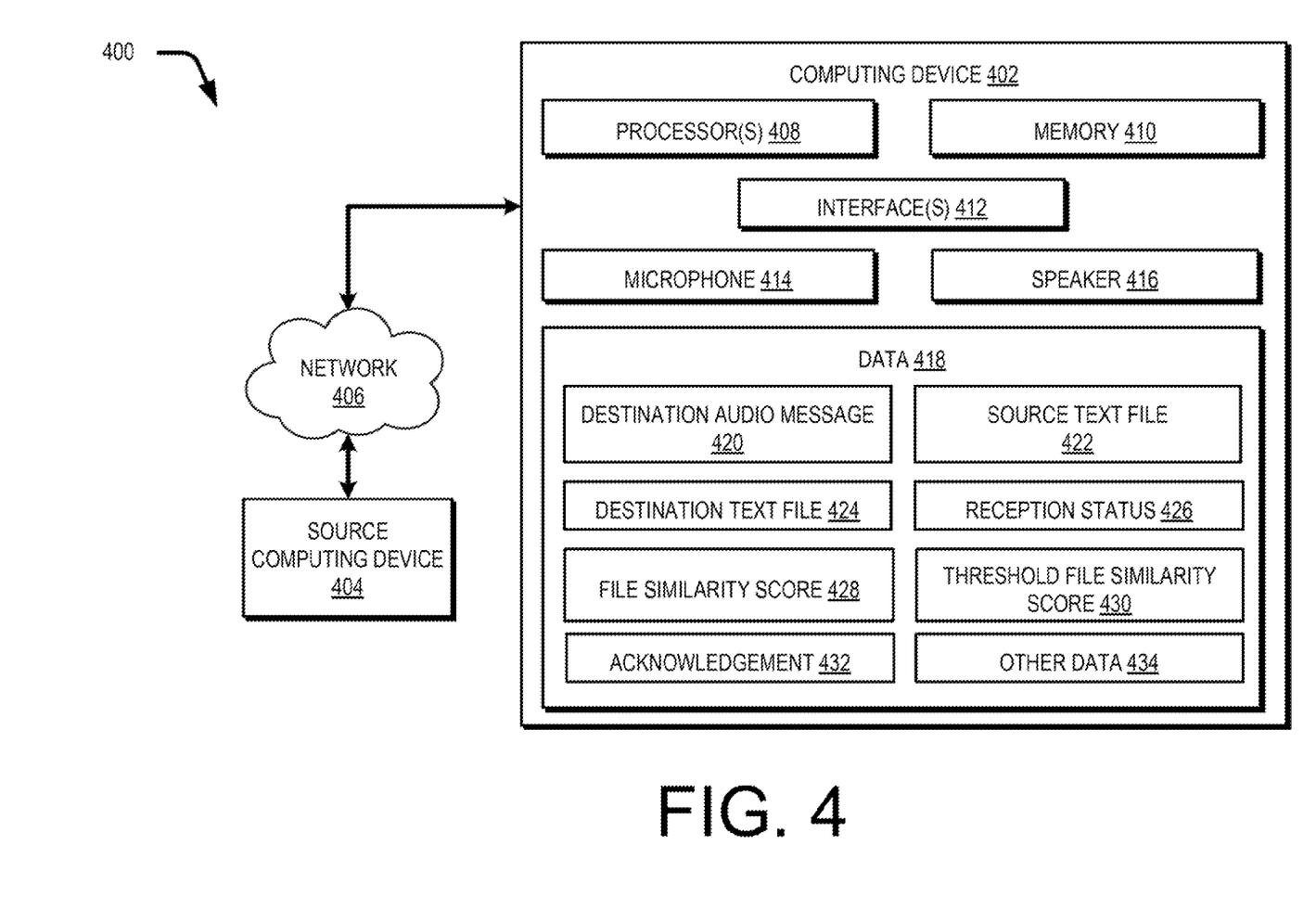
FIG. 4 is an example of communication environment with a detailed block diagram of an example computing device, as per another example of the present subject matter.

FIG. 4 illustrates a communication environment 400 comprising a computing device 402, as per another example of the present subject matter. In an example, the computing device 402 may correspond to the computing device 300 depicted in FIG. 1.

As described earlier, the computing device 402 may be in an audio-based communication session with a source computing device 404 over a network 406. The network 406 may correspond to the network 206 depicted in FIG. 2. Accordingly, details related to implementation of the network 406 are not reproduced for the sake of brevity.

In an example, the computing device 402 may host an application, which when executed, enables a user (not depicted in FIG. 4) of the computing device 402 to communicate with a user (not depicted in FIG. 4) of a source computing device 404. The application may execute to establish an audio-based communication session between the computing device 402 and the source computing device 404.

The computing device 402 may include a processor 408. Along with the processor 408, the computing device 402 may also include memory 410, interface 412, a microphone 414, and a speaker 416. In an example, the processor 408, memory 410, interface 412, microphone 414, and speaker 416 may correspond to the processor 208, memory 210, interface 212, microphone 214, and speaker 216 of the computing device 202. Accordingly, details related to implementation of the processor 408, memory 410, interface 412, microphone 414, and speaker 416 are not reproduced for the sake of brevity.

The computing device 402 may further include data 418. The data 418 may include data that is utilized or generated by the computing device 402 while performing a variety of functions. In an example, the data 418 includes destination audio message 420, source text file 422, destination text file 424, reception status 426, file similarity score 428, threshold file similarity score 430, acknowledgement 432, and other data 434. The other data 434, amongst other things, may serve as a repository for storing data that is processed, or received, or generated as a result of the execution of the instruction by the processor 408. The expressions 'reception status' and status of reception has been used interchangeably throughout the description to refer to the status of reception of the source audio message at the destination computing device.

In operation, the processor 408 may cause the computing device 402 to receive a destination audio message 420 and a source text file 422 from the source computing device 404. The destination audio message 420 may correspond to a source audio message which may be generated at the source computing device 404 based on an audio input received from a user at the source computing device 404. Further, the source text file 422 may also be generated at the source computing device 404 based on the received audio input from the user, where the source text file 422 may represent the textual format of the source audio message.

Thereafter, the processor 408 may cause the destination audio message 420 to be played on the speaker 416. Based on the played destination audio message 420, the processor 408 may then generate a destination text file 424. The destination text file 424 may represent a textual format of the destination audio message 420 received at the computing device 402. In an example, the destination text file 424 may be generated from the destination audio message based on Natural Language Processing (NLP). However, any other techniques for generating the destination text file 424 base on the played destination audio message may be used without deviating from the scope of the present subject matter.

The processor 408 may then compare the source text file 422 and the destination text file 424 to determine a reception status 426 of the source audio message. In an example, the processor 408 may determine the reception status 426 of the source audio message based on a file similarity score 428 generated based on the comparison of the source text file 422 and the destination text file 424. In said example, the file similarity score 428 may be indicative of a measure of similarity between the source text file 422 and the destination text file 424.

The processor 408 may determine the reception status 426 of the source audio message to be successful, when the file similarity score 428 is determined to be greater than a threshold file similarity score 430. The threshold file similarity score 430 may be indicative of an extent of similarly entailed between the source text file 422 and the destination text file 424 that enables the source audio message to be correctly heard and interpreted at the destination computing device.

On the other hand, the processor 408 may determine the reception status 426 of the source audio message to be unsuccessful, when the file similarity score 428 is determined to be lower than the threshold file similarity score 430. The lower file similarity score may be attributed to modifications made to the source audio message during transmission. For instance, in an example, a portion of the source audio message may get lost during the transmission. Accordingly, the destination audio message 420 may be an incomplete version of the source audio message. In another example, the source audio message may include background noises from the surroundings of the source computing device 404. In such cases, the destination audio message 420 received at the computing device 402 may reciprocate the source audio message along with background noises. Examples of such background noises may include, but are not limited to, environmental noises, peripheral speech, and electrical noise from appliances which may be present in the vicinity of the source computing device 404.

In an example of the present subject matter, the unsuccessful reception status 426 of source audio message at the computing device 402 from the source computing device 404 may be attributed to a deficiency in operation of the computing device 402. In an example, on determining the reception status 426 of the source audio message to be unsuccessful, the processor 408 may determine an operating state of the speaker 416, or a network connectivity of the computing device 402, or a combination thereof. If the network connectivity of the computing device 402 is found to be poor or the operating state of the speaker 416 is found to be faulty, the processor 408 may generate a notification indicating the poor network connectivity of the computing device 202 or the faulty operating state of the speaker 416.

The processor 408 may then provide an acknowledgement 432 indicating the reception status 426 of the source audio message to the source computing device 404. The processor 408 may provide the acknowledgement 432 indicating the reception status 426 of the source audio message in a number of ways. For example, the processor 408 may provide the acknowledgement indicating the reception status 426 by transmitting an acknowledgement message to the source computing device 404.

It would be noted that while the present description has been described with respect to the computing device 402 communicating with a single computing device in the audio-based communication session, i.e., the source computing device 404, it may be understood that the same has been done for the sake of clarity. It would further be noted that the computing device 402 may be in communication with a plurality of other computing devices in the audio-based communication session, such as during a conference call, without deviating from the scope of the present subject matter.

As may be noted, the computing device 402 allows to automatically determine whether the source audio message has been correctly received or not, thereby reducing the delays associated with verbal confirmations. The computing device 402 further facilitates ascertaining whether the complete source audio messages are being received or not, thereby ensuring high efficiency in reception of of the source audio messages.

Figure 5:
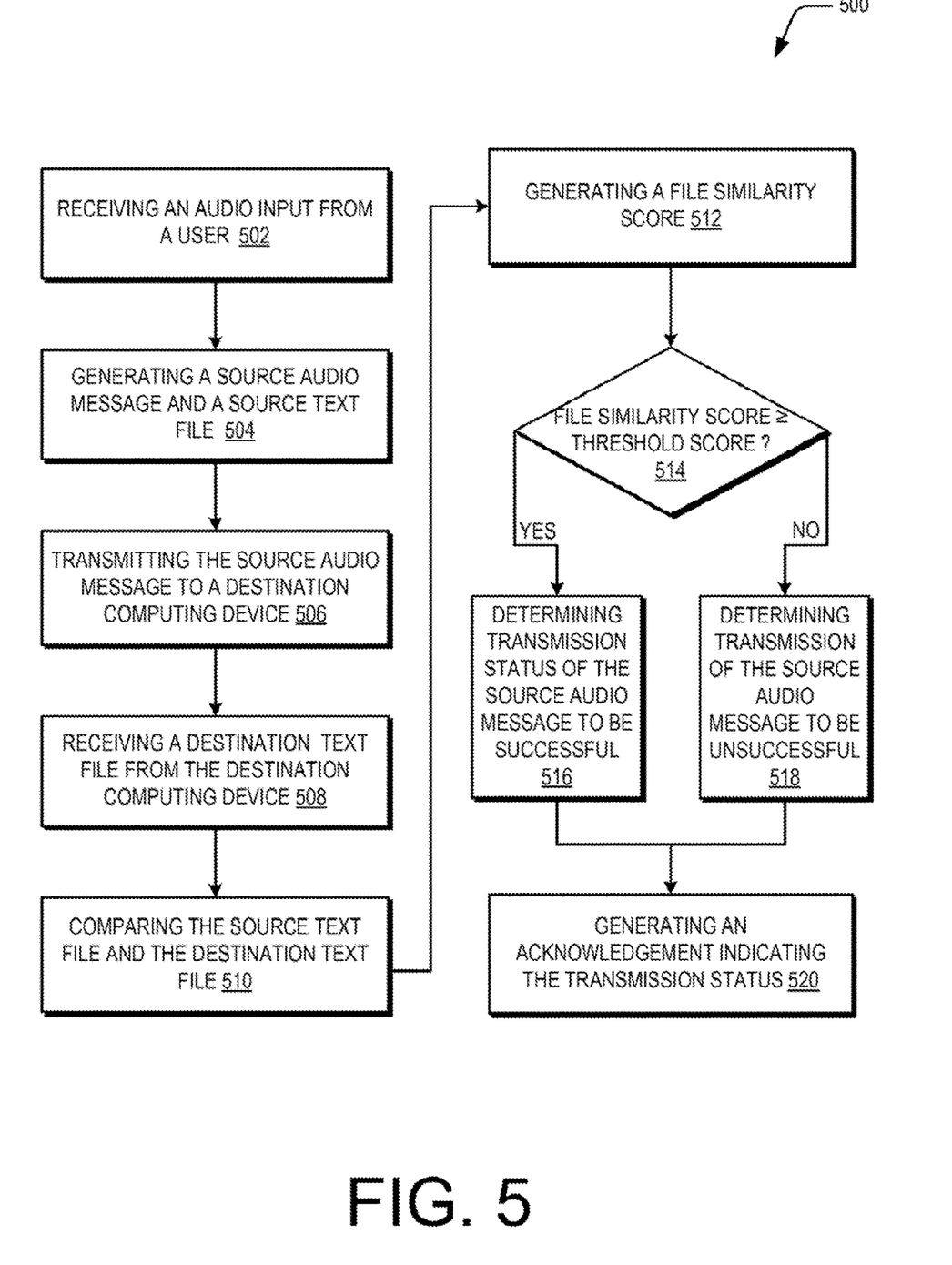
FIG. 5 is a flowchart of an example method to be implemented in a computing device, as per an example of the present subject matter.

FIG. 5 illustrates a method 500 to be implemented by computing device 202, as per an example of the present subject matter. Although the method 500 may be implemented for servicing of a variety of computing devices, for the ease of explanation, the present description of the example method 500 is provided in reference to the above-described computing device 202. The order in which the various method blocks of method 500 are described, is not intended to be construed as a limitation, and any number of the described method blocks may be combined in any order to implement the method 500, or an alternative method.

The blocks of the method 500 may be implemented through instructions stored in a non-transitory computer-readable medium, as will be readily understood. The non-transitory computer-readable medium may include, for example, digital memories, magnetic storage media, such as magnetic disks and magnetic tapes, hard drives, or optically readable digital data storage media.

At block 502, an audio input may be received from a user. In an example, the audio input may be received from the user through a microphone 214 of the computing device 202.

At block 504, a source audio message and a source text file may be generated. The source audio message and the source text file may be generated corresponding to the received audio input. In an example, the source audio message may be generated by converting the audio input received in analog format to digital format. Further, the source text file may be generated from the audio input based on Natural Language Processing (NLP). The source text file may represent a textual format of the audio input received from the user. In an example, the source audio message and the source text file may be generated by a processor 208 of the computing device 202.

At block 506, the source audio message may be transmitted to a destination computing device. In an example, the processor 208 of the computing device 202 may cause the source audio message to be transmitted to the destination computing device.

At block 508, a destination text file may be received from the destination computing device. The destination text file may be generated corresponding to a destination audio message played at the destination computing device, where the destination audio message may be received by the destination computing device corresponding to the source audio message. In an example, the processor 208 may cause the computing device 202 to receive the destination text file from the destination computing device.

At block 510, the source text file and the destination text file may be compared to determine a transmission status of the source audio message. In an example, the source text file and the destination text file may be compared by the processor 208.

At block 512, a file similarity score may be generated. The file similarity score may be generated based on the comparison of the source text file and the destination text file. The file similarity score may be indicative of a measure of similarity between the source text file and the destination text file. In an example, the file similarity score may be generated by the processor 208.

At block 514, the file similarity score may be compared with a threshold file similarity score, where the threshold file similarity score may be indicative of an extent of similarity entailed between the source text file and the destination text file that enables the source audio message to be correctly heard and interpreted at the destination computing device. If the file similarity score is determined to be greater than the threshold file similarity score ('Yes' path from block 514), the transmission status of the source audio message to be successful (see block 516).

On the other hand, if the file similarity score is determined to be lower than the threshold file similarity score ('No' path from block 514), the processor 208 may determine the transmission status of the source audio message to be unsuccessful (block 518).

At block 520, an acknowledgement indicating the transmission status of the source audio message from the computing device to the destination computing device may be generated. The acknowledgement indicating the transmission status of the source audio message may be generated by changing colour of an indicator corresponding to the destination computing device in a user interface (UI) of an application being used for communication between the computing device and the destination computing device. In an example, the acknowledgement may be generated by the processor 208.

Figure 6:
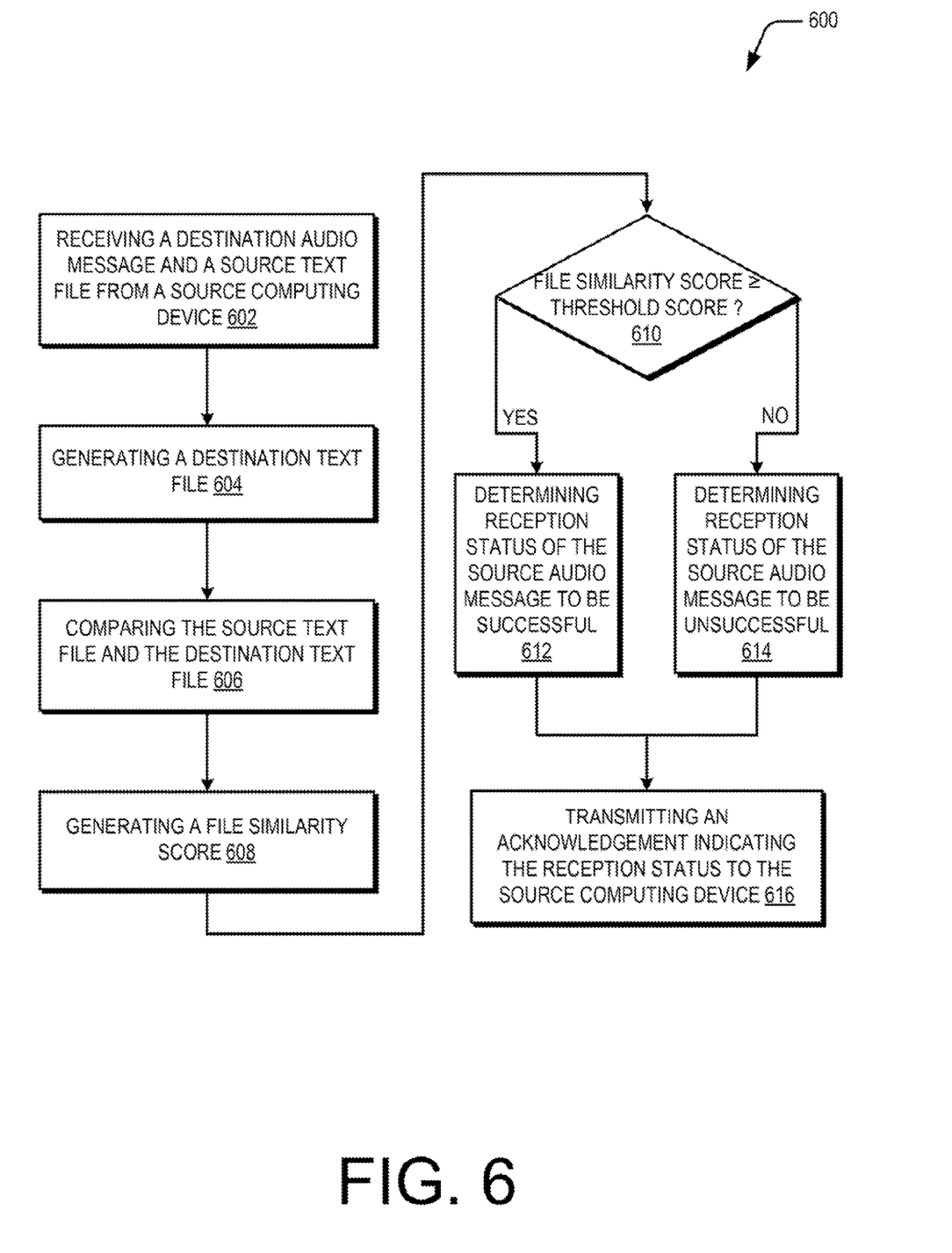
FIG. 6 is a flowchart of an example method to be implemented in a computing device, as per another example of the present subject matter.

FIG. 6 illustrates a method 600 to be implemented by computing device 402, as per another example of the present subject matter. Although the method 600 may be implemented for servicing of a variety of computing devices, for the ease of explanation, the present description of the example method 600 is provided in reference to the above-described computing device 402. The order in which the various method blocks of method 600 are described, is not intended to be construed as a limitation, and any number of the described method blocks may be combined in any order to implement the method 600, or an alternative method.

The blocks of the method 600 may be implemented through instructions stored in a non-transitory computer-readable medium, as will be readily understood. The non-transitory computer-readable medium may include, for example, digital memories, magnetic storage media, such as magnetic disks and magnetic tapes, hard drives, or optically readable digital data storage media.

At block 602, a destination audio message and a source text file may be received from a source computing device. The destination audio message corresponds to a source audio message, where the source audio message and the source text file are generated based on an audio input received from a user at the source computing device. In an example, processor 408 of the computing device 402 may cause the reception of the destination audio message and the source text file from the source computing device.

At block 604, a destination text file may be generated based on the received destination audio message. The destination text file may represent a textual format of the destination audio message received at the computing device. In an example, the destination text file may be generated by the processor 408.

At block 606, the source text file and the destination text file may be compared. In an example, the source text file and the destination text file may be compared to determine a status of reception of the source audio message from the source computing device. In said example, the source text file and the destination text file may be compared by the processor 408.

At block 608, a file similarity score may be generated based on the comparison of the source text file and the destination text file. The file similarity score may be indicative of a measure of similarity between the source text file and the destination text file. In said example, file similarity score may be generated by the processor 408.

At block 610, the file similarity score may be compared with a threshold file similarity score. In an example, the file similarity score may be compared with the threshold file similarity score by the processor 408.

If the file similarity score 428 is determined to be greater than the threshold file similarity score ('Yes' path from block 610), the method may proceed to block 612, where the reception status of the source audio message is to be successful. On the other hand, if the file similarity score is determined to be lower than the threshold file similarity score ('No path from block 610), the method may proceed to block 614, where the reception status of the source audio message is determined to be unsuccessful (block 614). The method 600 may then proceed to block 616.

At block 616, an acknowledgement indicating the reception status may be transmitted to the source computing device. In an example, the acknowledgement indicating the reception status may be transmitted by the processor 408.

Figure 7:
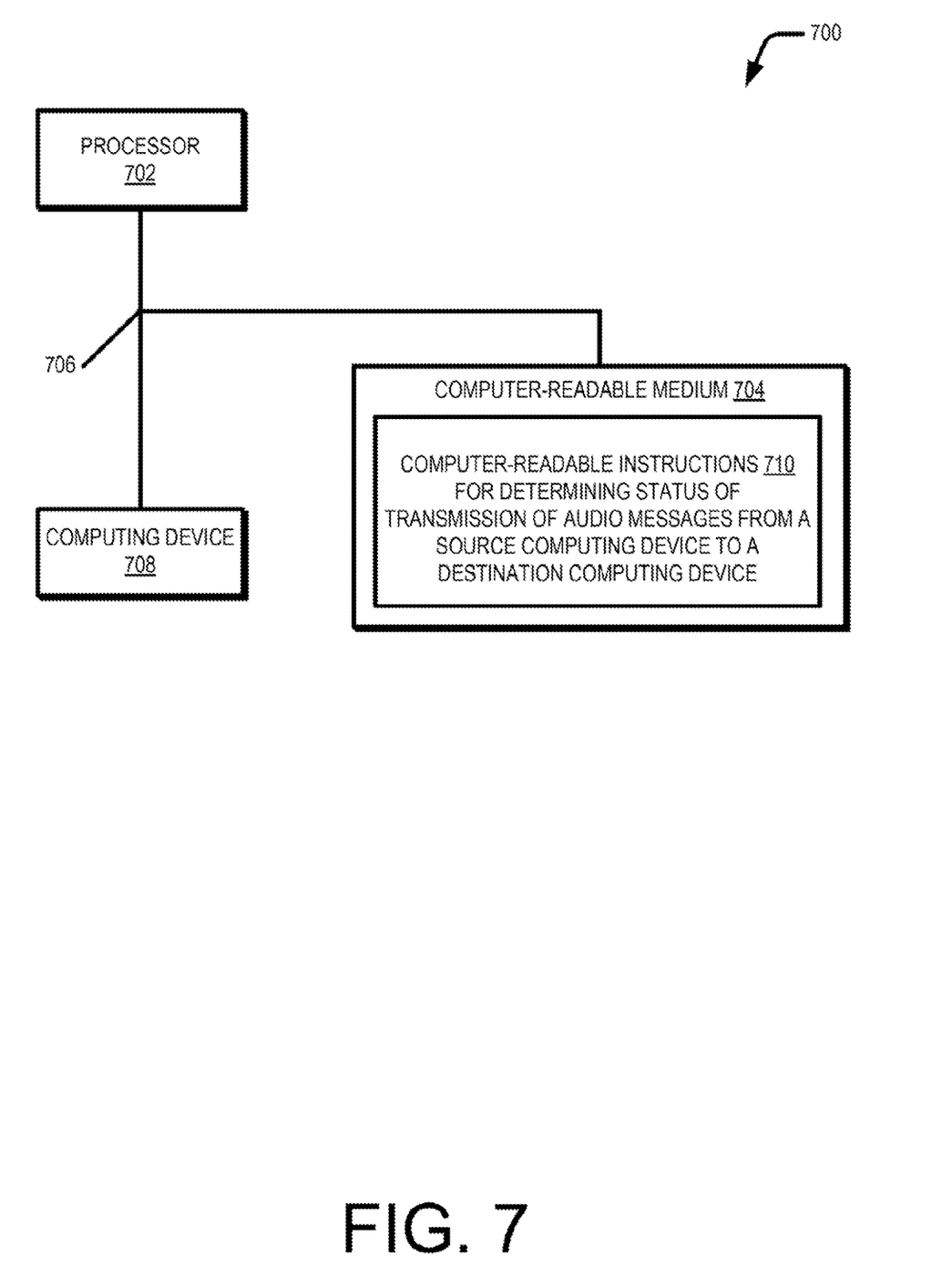
FIG. 7 illustrates a non-transitory computer-readable medium for causing a computing device to determine status of transmission of audio messages from a source computing device to a destination computing device, as per an example of the present subject matter.

FIG. 7 illustrates a computing environment 700 implementing a non-transitory computer readable medium for determining status of transmission of audio messages from a source computing device to a destination computing device. In an example, the computing environment 700 includes processor 702 communicatively coupled to a non-transitory computer readable medium 704 through communication link 706. In an example, the processor 702 may have one or more processing resources for fetching and executing computer-readable instructions from the non-transitory computer readable medium 704. The processor 702 and the non-transitory computer readable medium 704 may be implemented in a computing device 708 communicatively coupled to the source computing device and the destination computing device.

The non-transitory computer readable medium 704 may be, for example, an internal memory device or an external memory. In an example implementation, the communication link 706 may be a network communication link, or other communication links, such as a PCI (Peripheral component interconnect) Express, USB-C (Universal Serial Bus Type-C) interfaces, I²C (Inter-Integrated Circuit) interfaces, etc. In an example implementation, the non-transitory computer readable medium 704 includes a set of computer readable instructions 710 which may be accessed by the processor 702 through the communication link 706 and subsequently executed to determine status of transmission of audio messages from a source computing device to a destination computing device.

Referring to FIG. 7, in an example, the non-transitory computer readable medium 704 includes computer readable instructions 710 that cause the processor 702 to receive a source audio message from a source computing device. The source audio message may correspond to an audio input received from a user at the source computing device.

The instructions 710 may further cause the processor 702 to generate of a source text file corresponding to the source audio message. The instructions 710 may further cause the processor 702 to transmit the source audio message to the destination computing device. Further, the instructions 710 may cause the processor 702 to receive a destination text file from the destination computing device, where the destination text file may be generated corresponding to a destination audio message received at the destination computing device, and where the destination audio message may be received by the destination computing device corresponding to the source audio message.

Furthermore, the instructions 710 may cause the processor 702 to compare the source text file and the destination text file to determine a status of transmission of the source audio message from the source computing device to the destination computing device. The instructions 710 may determine the status of transmission of the source audio message to be successful, when a file similarity score generated based on the comparison of the source text file and the destination text file is greater than a threshold file similarity score. The threshold file similarity score may be indicative of an extent of similarity entailed between the source text file and the destination text file that enables the source audio message to be correctly heard and interpreted at the destination computing device. On the other hand, the instructions 710 may determine the status of transmission of the source audio message to be unsuccessful, when a file similarity score generated based on the comparison of the source text file and the destination text file is lower than the threshold file similarity score.

Moreover, the instructions 710 may cause generation of an acknowledgement indicating the status of transmission of the source audio message based on the comparison of the source text file and the destination text file. In an example, the instructions 710 may cause the acknowledgement indicating the status of transmission of the source audio message to be transmitted to the source computing device. In another example, the instructions 710 may cause the acknowledgement indicating the status of transmission of the source audio message to be transmitted to the destination computing device.

Although examples for the present disclosure have been described in language specific to structural features and/or methods, it is to be understood that the appended claims are not necessarily limited to the specific features or methods described. Rather, the specific features and methods are disclosed and explained as examples of the present disclosure.

We claim:

1. A computing device comprising:
a microphone to receive an audio input from a user;
a processor coupled to the microphone, wherein the processor is to:
generate a source audio message and a source text file corresponding to the audio input received from the user;
transmit the source audio message to a destination computing device; and
receive a destination text file from the destination computing device, wherein the destination text file is generated corresponding to a destination audio message played at the destination computing device, and wherein the destination audio message is received by the destination computing device corresponding to the source audio message;
compare the source text file and the destination text file to determine a status of transmission of the source audio message from the computing device to the destination computing device; and
generate an acknowledgement indicating the status of transmission of the source audio message from the computing device to the destination computing device based on the comparison of the source text file and the destination text file.

2. The computing device as claimed in claim 1, wherein the processor determines the status of transmission of the source audio message to be successful when a file similarity score generated based on the comparison of the source text file and the destination text file is greater than a threshold.

3. The computing device as claimed in claim 1, wherein the processor determines the status of transmission of the source audio message to be unsuccessful when a file similarity score generated based on the comparison of the source text file and the destination text file is lower than a threshold.

4. The computing device as claimed in claim 3, wherein the processor determines at least one of an operating state of a microphone of the computing device and a network connectivity of the computing device, when the status of transmission of the source audio message is unsuccessful.

5. The computing device as claimed in claim 4, wherein the processor is to generate a notification indicating the at least one of the operating state of the microphone and the network connectivity of the computing device.

6. A computing device comprising:
a processor to:
receive a destination audio message and a source text file from a source computing device, wherein the destination audio message corresponds to a source audio message, and wherein the source audio message and the source text file are generated based on an audio input received from a user at the source computing device;
generate a destination text file based on the received destination audio message;
compare the source text file and the destination text file to determine a status of reception of the source audio message from the source computing device; and
transmit an acknowledgement indicating the status of reception of the source audio message to the source computing device based on the comparison of the source text file and the destination text file.

7. The computing device as claimed in claim 6, wherein the computing device further includes a speaker to play the destination audio message, and wherein the processor is to generate the destination text file based on the destination audio message played on the speaker.

8. The computing device as claimed in claim 6, wherein the processor generates the destination text file from the destination audio message based on Natural Language Processing (NLP).

9. The computing device as claimed in claim 6, wherein the processor determines the status of reception of the source audio message to be unsuccessful when a file similarity score generated based on the comparison of the source text file and the destination text file is lower than a threshold.

10. The computing device as claimed in claim 8, wherein the processor is to further determine at least one of an operating state of a speaker of the computing device and a network connectivity of the computing device, when the status of reception of the audio message is unsuccessful.

11. A non-transitory computer readable medium comprising computer-readable instructions that when executed cause a processor of a computing device to:
  receive a source audio message from a source computing device, wherein the source audio message corresponds to an audio input received from a user at the source computing device;
  generate a source text file corresponding to the source audio message;
  transmit the source audio message to a destination computing device;
  receive a destination text file from the destination computing device, wherein the destination text file is generated corresponding to a destination audio message received at the destination computing device, and wherein the destination audio message is received by the destination computing device corresponding to the source audio message;
  compare the source text file and the destination text file to determine a status of transmission of the source audio message from the source computing device to the destination computing device; and
  generate an acknowledgement indicating the status of transmission of the source audio message based on the comparison of the source text file and the destination text file.

12. The non-transitory computer-readable medium as claimed in claim 11, wherein the instructions cause the computing device to determine the status of transmission of the source audio message to be successful, when a file similarity score generated based on the comparison of the source text file and the destination text file is greater than a threshold.

13. The non-transitory computer-readable medium as claimed in claim 12, wherein the instructions cause the computing device to determine the status of transmission of the source audio message to be unsuccessful, when the file similarity score is lower than the threshold.

14. The non-transitory computer-readable medium as claimed in claim 11, further comprising instructions to cause the computing device to transmit the acknowledgement indicating the status of transmission of the source audio message to the source computing device.

15. The non-transitory computer-readable medium as claimed in claim 11, further comprising instructions to cause the computing device to transmit the acknowledgement indicating the status of transmission of the source audio message to the destination computing device.

* * * * *